W. T. ESTBERG.
AUTOMOBILE LOCK.
APPLICATION FILED FEB. 19, 1919.
1,305,786.
Patented June 3, 1919.
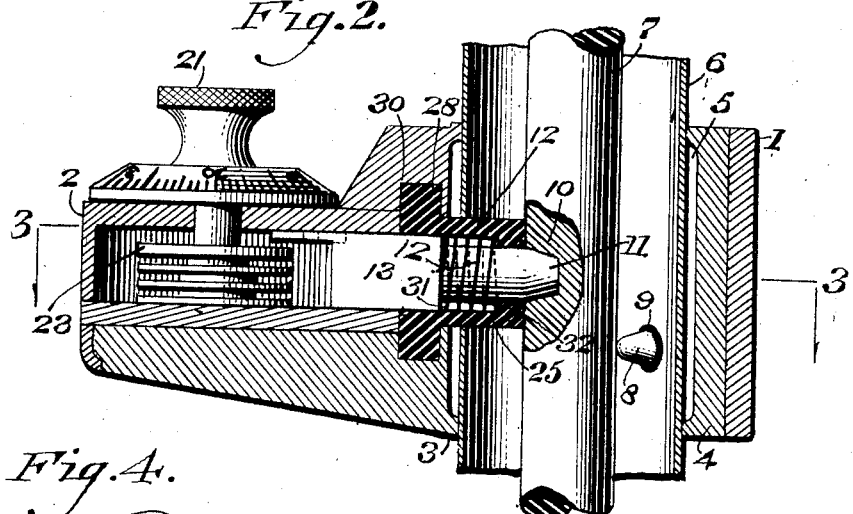
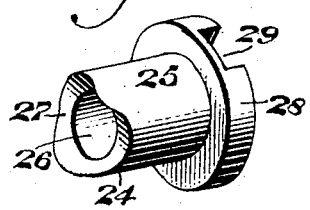
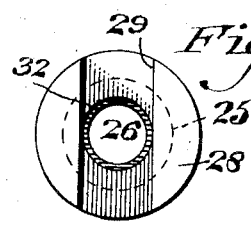
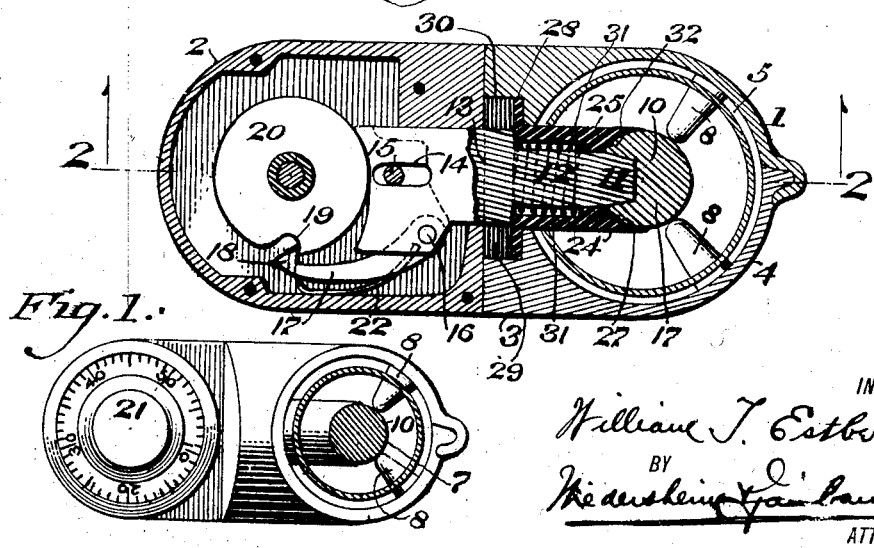
INVENTOR
William T. Estberg.
BY
ATTORNEYS.

UNITED STATES PATENT OFFICE.

WILLIAM T. ESTBERG, OF CAMDEN, NEW JERSEY.

AUTOMOBILE-LOCK.

1,305,786.     Specification of Letters Patent.     Patented June 3, 1919.

Application filed February 19, 1919. Serial No. 278,160.

*To all whom it may concern:*

Be it known that I, WILLIAM T. ESTBERG, a citizen of the United States, residing in the city and county of Camden, State of New Jersey, have invented a new and useful Automobile-Lock, of which the following is a specification.

My invention consists of a novel construction of a combination automobile lock, comprising a lock casing adapted to be applied to and engaged with the steering wheel column of an automobile, and which contains a locking bolt adapted to interlock with a suitable seat in the steering rod, in conjunction with a novel construction of spring-pressed bushing or sleeve by the employment of which the bolt is positively guided against and enabled to interlock with the rod which controls the steering mechanism.

To the foregoing ends, my invention comprehends a novel construction of bushing, spring and adjuncts collocated with a locking device and coacting with the steering mechanism.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of my novel automobile locking device, the steering column and steering rod being shown in section, and the rod being locked.

Fig. 2 represents a section on line 2—2 Fig. 3, certain parts being shown in elevation, and the steering rod being locked.

Fig. 3 represents a section on line 3—3 Fig. 2.

Fig. 4 represents a perspective view of my novel construction of sleeve which coacts with the locking bolt employed.

Fig. 5 represents a plan view of the sleeve seen in Fig. 4.

Similar numerals of reference indicate corresponding parts.

Referring to the drawings:—

1 designates my novel construction of a combination automobile lock of any preferred character, which is contained within a casing preferably composed of an upper member 2 and a lower member 3. The lower member 3 at one of the ends, preferably its right hand end, carries or is formed with an extension 4, which is made in sections in the usual manner, which when assembled have a vertical opening 5 through them which is adapted to fit snugly upon and serve as a bearing for the column 6 of a steering mechanism. Within this is contained the steering rod 7.

8 designates radially and inwardly projecting lugs, formed upon the interior walls of the vertical opening 5 of the extension 4, which project through holes 9 in the steering column and are adapted to contact with the steering rod 7, which latter is provided with a seat 10, within which the pointed or tapered end 11 of the locking bolt 12 enters. This bolt at its rear has a head 13 provided with a slot 14, through which passes a guide pin 15 within the upper member of the casing.

The bolt head 13 has pivotally secured to it at 16 a pawl 17, which has a nose 18 adapted to engage a recess 19 of a disk 20 of the lock, which disk is rotated by the knob 21. When the notch 19 of the disk 20 registers with the nose 18 of the pawl 17, a spring 22 within the casing will cause said nose to engage said notch, with the result that the end 11 of the bolt 12 will be moved into or out of engagement with the seat 10 in the steering rod 7, according to the construction and operation of the tumblers of the lock.

It will be apparent that any suitable type of combination lock such as is designated 23, may be employed, and that any suitable mechanism may be employed to effect the reciprocation of the locking bolt 12, and, as my invention appertains particularly to a novel construction of guiding sleeve or bushing which coacts with said locking bolt, I deem it unnecessary to describe the lock *per se* in greater detail.

The bushing or sleeve which I have designated 24, is illustrated in Figs. 4 and 5 as removed from both the lock casing and its extension 4 into which it partly enters and from which it extends through the steering wheel column 6, and it is composed of a tubular portion 25, the hollow interior or bore of which is designated 26. At one end the sleeve is formed with a radially extending disk or collar designated 28, which is transversely slotted at 29 upon its exterior face so as to adapt it to fit over the head 13 of the locking bolt 12, and at its other end is concaved, as at 27, to conform to the cylindric conformation of the steering rod, which as best shown in Figs. 1 and 3, it overlaps, and seats itself against.

In the mounting of the parts, I interpose between the bolt head 13 and a shoulder 32 within the outer end of the bore 26 through the sleeve, a spiral spring 31, which tends normally to prevent rattling and to retain the sleeve in contact with the steering rod.

It will be apparent that the sleeve performs a useful and dual function in both properly guiding the bolt in its reciprocations toward and away from its seat in the steering rod, and in holding it in its locked position in its seat in the steering rod.

Although I have explained that no form of combination lock is of the essence of my invention, I yet prefer to use a lock the head of the bolt of which possesses the general form shown in the drawings, in order that its squared outer end from which the cylindric locking bolt 12 extends may fit within the slot 29 in the collar 28 of the sleeve 24.

There is no possibility of the sleeve's rotating after the several parts have been mounted, because the squared contour of the bolt head in its mounting within the lock casing and the circular formation of the collar 28 on the sleeve abutting against the shoulder 20 of the casing, as well as the interlocking of the slot 29 with the bolt head, and the further peculiar formation or concavity of said sleeve extending over and snugly engaging with the periphery of the steering rod prevent any such result.

The sleeve when in the locked position shown in Figs. 1, 2 and 3 of the drawings, by reason of its mounting and formation maintains such position, and serves, as stated, as a means for directing the in and out movement of the bolt of the lock and for maintaining itself against the steering rod.

As will also be obvious, the radial lugs 8 coöperate with the concavity of the sleeve and with the bolt in maintaining the alinement of the steering rod within the steering column.

Having thus described my invention, what I claim as new and desire to secure by Letters Patent, is:—

1. An automobile lock, which comprises in combination:—casing,—a lock within said casing,—a bolt formed with a polygonal head and a projecting end and reciprocable within the casing under the control of the lock,—a steering column having said casing attached thereto,—a cylindric steering rod within said column formed with a bolt seat in range of the end of the bolt,—and a tubular sleeve passing through said column and having an externally slotted collar at one end adapted to fit over the bolt head and a concavity at the other end adapted to fit over and contact with the cylindric exterior of the steering rod in proximity to said seat whereby said bolt end is guided at all times with respect to its seat,—and a helical spring within the tubular bore of the sleeve and abutting between a shoulder within said bore and the bolt head, said spring tending to normally unseat said bolt from its seat.

2. An automobile lock, which comprises in combination:—a casing,—a lock within said casing,—a bolt formed with a squared head and a projecting end and reciprocable within the casing under the control of the lock,—a sleeve for said bolt, a steering rod,—a steering column having said casing attached thereto, said casing having radially and inwardly projecting lugs which bear against the steering rod and coöperate with the sleeve and bolt to retain the steering rod in locked position, said steering rod being formed with a bolt seat in alinement with said bolt,—and a helical spring within the tubular bore of the sleeve and abutting between a shoulder within said bore and the bolt head.

3. In an automobile lock, a casing, a bolt within said casing, means for reciprocating said bolt, a sleeve surrounding said bolt and having its inner end flanged and interlocked therewith, the outer end of said sleeve being concaved and adapted to pass through a steering column and contact with and fit against the juxtaposed surface of a steering rod, an internal shoulder in said sleeve, a shoulder on said bolt, and a helical spring contained in said sleeve and surrounding said bolt and abutting against said shoulders, said spring tending normally to unseat said bolt from its seat.

WILLIAM T. ESTBERG.

Witnesses:
E. HAYWARD FAIRBANKS,
C. D. McVAY.